United States Patent [19]

Sawa et al.

[11] 4,327,137
[45] Apr. 27, 1982

[54] MULTILAYERED HOLLOW CONTAINER

[75] Inventors: Yuji Sawa; Shigeru Endo; Tsutomu Uehara, all of Iwaki, Japan

[73] Assignee: Kureha Kagaku Kogyo Kabushiki Kaisha, Tokyo, Japan

[21] Appl. No.: 192,443

[22] Filed: Sep. 30, 1980

Related U.S. Application Data

[63] Continuation-in-part of Ser. No. 30,714, Apr. 16, 1979, abandoned.

[30] Foreign Application Priority Data

Apr. 28, 1978 [JP] Japan ................................. 53-50922

[51] Int. Cl.$^3$ ........................ B32B 1/02; B32B 27/06
[52] U.S. Cl. .................................... 428/35; 206/819; 264/512; 428/213; 428/412; 428/480
[58] Field of Search ............... 428/35, 36, 412, 480, 428/213; 264/241, 512, 515, 540, DIG. 1; 206/484, 484.1, 524.1, 524.2, 819; 156/244.11, 244.13; 425/523, 532

[56] References Cited

U.S. PATENT DOCUMENTS

| | | | |
|---|---|---|---|
| 3,819,792 | 6/1974 | Ono et al. | 264/515 |
| 3,914,502 | 10/1975 | Hayashi et al. | 428/480 |
| 3,955,697 | 5/1976 | Valyi | 428/35 |
| 4,107,362 | 8/1978 | Valyi | 428/35 |

FOREIGN PATENT DOCUMENTS 857946 12/1977 Belgium .
1455596 11/1976 United Kingdom .

Primary Examiner—Paul J. Thibodeau
Attorney, Agent, or Firm—Wegner & Bretschneider

[57] ABSTRACT

A multilayered hollow container formed by direct blow-molding, comprising at least one layer of thermoplastic polyester and at least one layer of polycarbonate, said layer of thermoplastic polyester and said layer of polycarbonate being laminated without any adhesive.

4 Claims, No Drawings

MULTILAYERED HOLLOW CONTAINER

The present application is a continuation-in-part of the application Ser. No. 30,714, filed Apr. 16, 1979, now abandoned.

The present invention relates to a multilayered hollow container formed by direct blow-molding, which comprising a layer of thermoplastic polyester and a layer of polycarbonate having excellent properties of clearness, gas-barrier, fragrance-keeping, strong impact strength, inter-layer adhesiveness, healthfulness, formability and thermal resistance.

As a thermoplastic polyester, for instance, polyethylene terephthalate, and polybutylene telephthalate, to begin with, copolyester of cyclohexylene dimethylol with terephthalic acid and isophthalic acid (Registered Trade Mark "Eastman Kodak" copolyester A 150) and other modified polyesters have been known recently. These polyesters are excellent in gas-barrier property and widely popularized as a packaging material for foods, pharmaceuticals and the likes.

However, thermoplastic polyester is known as an extremely hygroscopic resin and, although its hydrolysis proceeds slowly at a temperature lower than its melting point, the hydrolysis rapidly proceeds to lead to the reduction of degree of polymerization at a temperature higher than its melting point and moreover poisonous acetaldehyde may be formed therefrom. Accordingly, it is indispensable to dry the polyester resin to remove its moisture in case of molding. However, since it is very difficult to completely dehydrate the polyester resin, the molding is carried out usually in the presence of a minute amount of moisture of from a few score to a few hundred ppm. Therefore, it is inevitable to have a reduction of degree of polymerization due to hydrolysis of the resin and the probable generation of acetaldehyde in the time of molding.

Also, the polycondensation in the usual preparation of thermoplastic polyester material itself is carried out in the presence of a catalyst, and since Zn, Cd and Mn salts of fatty acid or metal oxides such as MgO, $Sb_2O_3$, and the like are utilized as the catalyst, there may be a problem of elution of such metal salt during use of the molded containers.

In addition, since the draw-down of a parison sent forth from a die is large in the so-called low viscosity-polyethylene terephthalete of intrinsic viscosity of 0.6–0.7 dl/g and in the moderate viscosity-polyethylene terephthalate of intrinsic viscosity of 0.7–0.8 dl/g it is not possible to have a uniform thickness of the molded bottle of large capacity as well as of a small bottle. Accordingly, the forming by direct-blow molding is very difficult, and the injection-blowing or the stretch-blowing is mainly carried out on polyethylene terephthalate resins, and so the processing apparatus becomes complicated with the expense of the cost of installation. Moreover, the molded containers suffer from thermal shrinkage or thermal deformation at a temperature higher than 55° C., thus fall short of thermal resistance.

On the other hand, the so-called high viscosity-polyethylene terephthalete of intrinsic viscosity of 0.8–1.2 dl/g is possible to be processed by direct-blow molding, but the obtained containers lose their elasticity at a temperature higher than 60° C., and easily deform and bend during the transportation of the containers filled with hot foods containing water, or in the time when the internal stopper is put into the container. Further, when the scrap of such a resin is recovered, its melt-viscosity has been reduced due to hydrolysis to make the draw-down at the molding larger with a result of enlarging of uneven thickness. Polyethylene terephthalete resins are short of heat-resistance and formability as mentioned above, and other thermoplastic polyesters equally have demerits in shortage of thermal resistance and formability. In spite of these demerits, since there are no appropriate adhesives for the forming by coextrusion, the thermoplastic polyester has hitherto been utilized singly as a material for bottles.

Accordingly, one of the objects of the present invention is to provide multilayered hollow containers formed by direct blow-molding comprising a thermoplastic polyester resin layer and a polycarbonate resin layer which can be adhered to the polyester resin layer without the aid of any adhering layer and/or blending of any adhesive which is excellent in inter-layer adhesibility and is not exfoliated even under heating or stress. Another object of the present invention is to provide a molded article as packaging containers suitable for foods, pharmaceuticals and the like without the fear of unhealthyness of the above-mentioned thermoplastic polyester.

Still another object of the present invention is to provide a multilayered hollow container, formed by direct blow-molding, excellent in keeping fragrance, gas-barrier and also excellent in impact strength, heat stability and formability. The other objects, the characteristics and the merits of the present invention will be made obvious by the following description:

At least one layer of the multilayered hollow container formed by direct blow-molding of the present invention is made of a thermoplastic polyester. As the thermoplastic polyester, well known thermoplastic polyesters, for instance, polyethylene terephthalate, polybutylene terephthalate, to begin with, aromatic polyesters and copolymers thereof and the blends mainly made of these straight polymers and/or copolymers are utilized and above all, a thermoplastic polyester having an excellent gas-barriering property, preferably the oxygen-permeating rate of $1 \times 10^{-10}$ cc-cm/$cm^2$.sec.cmHg and the intrinsic viscosity in the range of 0.6–1.2 dl/g, particularly aromatic polyesters such as polyethylene terephthalate, polybutylene terephthalate, etc., aromatic copolymerized polyester such as aromatic random-copolymerized polyester of cyclohexane dimethylol and terephthalic- and isophthalic acids are preferable.

Because, in the case where the intrinsic viscosity of the polyester is less than that mentioned above, the draw-down becomes larger to make the forming difficult, and, on the contrary, in the case where the intrinsic viscosity of the polyester is more than that mentioned above, the time period of polycondensation becomes longer to make the forming not economic. By the way, the above-mentioned intrinsic viscosity is the value obtained using the solution of the polyester in a mixed solvent comprising 75% by weight of p-chlorophenol and 25% by weight of tetrachloroethane at 30° C.

The multilayered hollow container formed by direct blow-molding of the present invention is made by laminating at least one layer of polycarbonate with the above-mentioned thermoplastic polyester layer. Above all, in the case where the polycarbonate layer is placed as the innermost layer, it is possible to remove the fear of the hydrolysis of the above-mentioned thermoplastic polyester, and of the toxicity of the residue of catalyst of metal salt in the above-mentioned thermoplastic polyester, and such a special laminate is preferably utilized for making the formed articles as packaging containers of foods, pharmaceuticals and the like.

As the polycarbonate, not only the several well known so-called polycarbonates but also copolycarbonates, heretobound copolymers having carbonate bonds and other bonds in their main chain and the blends having these polycarbonates as the major component are utilized. Among them, those substances having an average molecular weight in the range of 10,000–50,000, more preferably of 23,000–32,000 are utilized, because the substances with an average molecular weight outside the above-mentioned range are not favourable due to the same reason as in the case of thermoplastic polyesters above-mentioned. That is, in the case where the average molecular weight is less than that in the above-mentioned range, the draw-down becomes larger to make the forming of the laminated material difficult, and in the case where the average molecular weight is more than that in the above-mentioned range, the time period of polycondensation becomes longer to make the process not economic. By the way, the above-mentioned number average molecular weight is obtained from the formula: $[\eta] = 1.23 \times 10^{-3} \bar{M}n^{0.83}$ wherein $\eta$ is intrinsic viscosity and $\bar{M}n$ is the number average molecular weight, the intrinsic viscosity being determined in a solution of the polycarbonate in dichloromethane at 30° C. Moreover, aromatic polycarbonates obtained by the phosgene process, particularly those of the bisphenol type represented by the general formula:

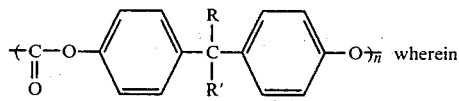 wherein wherein R and R' are respectively selected from the group consisting of hydrogen atoms, alkyl groups of carbon number of 1–6 and phenyl groups are preferably utilized because of the absence of the fear of acetaldehyde formation and elution of metal salts in the case of sole thermoplastic polyester and because of the excellent heat stability as well as the appropriateness in coextrusion with the thermoplastic polyester.

The thickness occupied by the polycarbonate layers, that is, in cases where the number of layers of polycarbonate is more than two, the total thickness of polycarbonate layers is more than 10 micron, and it is preferable to make the percentage of 5–60 of the thickness of the total laminated material, more preferably, 10–50%. In cases where the thickness of polycarbonate layers is more than that in the above-mentioned range, the gas-barrier property of the multilayered hollow container formed by direct blow-molding is impaired and the permeability coefficient to gaseous oxygen cannot be satisfied the specific property of the value of 15 ml/m²·day·atom at a temperature of 25° C. and at a relative humidity of 50%, and in the case where the thickness is less than that in the above-mentioned range, the thermal resistance and fregrance-keeping property are impaired accompanied by the defective forming due to the enlargement of unevenness of thickness by the draw-down.

The multilayered hollow containers formed by direct blow-molding of the present invention comprise at least one layer each of thermoplastic polyester and of polycarbonate, both resin layers being adjacently laminated without the aid of an adhesive layer. Such laminated articles have a close adhesion even when laminated without the aid of an adhesive, and the layers of the articles do not peel off, of course, even on impact such as in case of a dropping or on heating such as in the case of boiling for sterilization.

Moreover, they are prepared as an excellent laminated material without complexity in the process as in the case where an adhesive is used.

The multilayered hollow container formed by direct blow-molding of the present invention has preferably its total average thickness of 0.08–1.5 mm, and more preferably of 0.1–1.0 mm in range. In the case where the thickness is less than that in the above-mentioned range, the gas-barrier property and the impact strength become inferior and on the contrary, in the case where the thickness is more than that in the above-mentioned range, the production becomes not economic. In addition, the tensile secant modulus of elasticity at 1% strain and at a temperature of 80° C. of the multilayered hollow container formed by direct blow-molding of the present invention is preferably made more than 10 kg/mm², more preferably more than 15 kg/mm² for satisfying the above-mentioned thermal resistance. It is well known that the tensile secant modulus of elasticity of a laminated article is obtainable by calculation from the tensile secant modulus of elasticity of each layer. Accordingly, once a required tensile secant modulus of elasticity of the completed laminated article has been decided and the resin constitution has also been decided, the thickness of multilayer or the interrelationship of the thickness of each layer is decided. Accordingly, it is preferable to decide the thickness of each layer in order to fulfill such conditions, the thickness of the total layers and the thickness of the polycarbonate layer for obtaining formed articles excellent in gas-barrier property, fragrant-keeping property, thermal resistance, impact strength and formability.

The multilayered hollow containers formed by blow-molding according to the present invention are produced by direct-blowing prior to solidifing, after co-extruding by a method of intra-die melt-laminating. Although in the injection blow method, since the injection of parisons laminated at the same time is impossible, it is necessary to have many steps of obtaining the laminated parison by laminating each layer of parison and by blowing the laminated parison, in the case where the method of the present invention is which the direct-blowing carried out after co-extruding is used, a multilayered parison is obtained by one step. Accordingly, it is able to reduce the number of steps with a result of reducing the running cost of the production. In addition, the apparatus according to the method of the present invention is possibly reduced in size, as small as few fraction of the apparatus of the method of injection molding with a result of reducing the whole cost of production in a wide range. Furthermore, in the case of the method of injection blowing, since a parison having a thin layer is not available, the constitution of the thickness is restricted. On the other hand, in the method of the present invention, it is able to produce a parison in which a certain layer is made thinner in its thickness. From this point of view, it is possible to reduce the thickness of the unnecessarily thick layer to make the cost less expensive.

The method of the present invention is superior to the method of injection blowing from the above-mentioned point of view. Furthermore, since a container can not be produced by the extrusion lamination method or by the dry lamination method, the method of the present invention is industrially advantageous. Furthermore, it is possible to remove the fear of unhealthiness and they are preferably used even in the field which necessitates the sterilization by boiling with excellent qualities such as clearness, gas-barrier property, fragrance-keeping property and formability as well as thermal resistance, impact strength. They are widely used in particular as packaging containers for foods and pharmaceuticals.

The following are the more concrete examples for explaining the present invention, not limitative.

EXAMPLES 1–5

By using two extruders 40 mm in diameter for the outer layer and 35 mm in diameter for the inner layer, respectively, two layers of cylindrical parison were extruded by coextrusion method, at a resin temperature of 285° C. and at a rate of extrusion of 212 g/min. The resin for the outer layer was a high viscosity polyethylene terephthalate of an intrinsic viscosity of 1.0 dl/g and a specific gravity of 1.35, (Toyobo PET RT-580c, the Registered Trade Name). The resin for the inner layer was a high viscosity type of polycarbonate of a specific gravity of 1.2, (Teijin Panlite K-1300, the Registered Trade Name). The parison which was intra-die laminated was formed by extrusion and the extruded material was nipped with a pair of metal mold 58 mm in diameter and 123 mm in height forming a round bottle, and then blow-molded to be a container of a capacity of 300 ml. The conditions of the blow-molding were: the temperature of the metal die of 30° C., the blowing pressure of 2 kg/cm² and the ratio of blow-up of about 3.0. The physical properties of the containers obtained by the above-mentioned conditions are shown in Table 1 below.

COMPARATIVE EXAMPLE 1

By using only the high viscosity polyethylene terephthalate used in Examples, bottles with a single layer were formed by extrusion as in Examples. Their properties are also shown in Table 1.

COMPARATIVE EXAMPLE 2

By using only the polycarbonate used in Examples, bottles with a single layer were formed by extrusion as in Examples. Their properties are also shown in Table 1.

TABLE 1

Properties of Bottles produced in Examples 1–5 and Comparative Examples 1 and 2

| Items determined | Unit | Example 1 | Example 2 | Example 3 | Example 4 | Example 5 | Comparative Example 1 | Comparative Example 2 |
|---|---|---|---|---|---|---|---|---|
| Percentage of polycarbonate in total thickness (mean)* | % | 6 | 11.5 | 15 | 32 | 50 | 0 | 100 |
| Ratio of thickness of two layers | outer layer vs. inner layer | 15.5/1 | 7.7/1 | 5.8/1 | 2.5/1 | 1/1 | 10/0 | 0/10 |
| Weight | g | 13.4 | 13.1 | 13.8 | 13.1 | 13.0 | 13.0 | 13.0 |
| Mean thickness (body) | mm | 0.34 | 0.35 | 0.37 | 0.38 | 0.38 | 0.34 | 0.39 |
| Impact strength (1) | times of impact | 26 | 26 | 36 | 45 | 46 | 20 | 48 |
| Inter-layer adhesion (2) | — | not exfoliated | not exfoliated | not exfoliated | not exfoliated | not exfoliated | — | — |
| Tensile secant modulus of (3) elasticity | kg/mm² | 17 | 23 | 40 | 52 | 81 | 5 | 100 |
| Buckling deformation (4) | — | no | no | no | no | no | yes | no |
| Oxygen permeability (5) | ml/m² · day · atom | 8.0 | 8.5 | 8.4 | 9.6 | 12 | 8 | 35 |
| Fragrance keeping (6) | — | not significant | not significant | not significant | not significant | not significant | significant | not significant |
| Transmission of parallel light | % | 82.9 | 82.6 | 82.9 | 82.8 | 82.3 | 83 | 82 |
| Formability (7) | — | A | A | A | A | A | A | A |

Notes:
*body part
(1) After filling water at 5° C. in the specimen, each specimen of 100 bottles weighing 270 g each was dropped from a height of 1.5 m to a concrete floor repeatedly at max. 50 times (naturally fallen in normal posture). The mean times of repeated dropping until the bottle ruptured is tabulated.
(2) The presence or absence of inter-layer exfoliation when the bottle ruptured in the above-mentioned test and when the bottle was immersed in water at a temperature of 80° C. for 30 min.
(3) The tensile secant modulus of elasticity at the strain of 1% and at a temperature of 80° C.
(4) The presence or absence of buckling deformation when the sealed bottle filled with water at 80° C. was dropped from a height of 100 mm in normal posture to a steel plate.
(5) Determined under the conditions of a temperature of 25° C. and relative humidity of 50%.
(6) A soy bean sauce bottled in the sealed bottle specimen and kept for 2 months at 25° C. and relative humidity of 50% was compared to another soy bean sauce bottled in a sealed glass bottle and kept under the same conditions as above by sensory examination to find the significant difference between them. The data obtained by 10 sensors was averaged.
(7) Among 100 specimens, when the forming yield is more than 95%, it was evaluated as A; when the yield is between 95 and 50%, it was evaluated as B; when the yield is between 50 and 30%, it was evaluated as C; and when the yield was below 30%, it was evaluated as D.

EXAMPLE 6

A parison was produced in which the outer layer was polyethylene terephthalate of moderate viscosity and the inner layer was polycarbonate, under the conditions of resin temperature of 285° C. and the rate of extrusion of 212 g/min by intra-die lamination, the polyethylene terephthalate being 0.8 dl/g of intrinsic viscosity and the polycarbonate being the same as in Comparative Example 2. The thus obtained parison was formed as in Examples 1–5. The results are shown in Table 2.

COMPARATIVE EXAMPLE 3

Polyethylene terephthalate of moderate viscosity used in Example 6 was singly formed as in Example 6. The results are also shown in Table 2.

TABLE 2

Properties of Bottles produced in Example 6 and Comparative Examples 2 and 3

| Items determined | unit | Example 6 | Comparative Example 2 | Comparative Example 3 |
|---|---|---|---|---|
| Percentage of polycarbonate in total thickness (mean) | % | 50 | 100 | 0 |
| Weight | g | 12.8 | 13.0 | 11.7 |
| Mean thickness (body) | mm | 0.33 | 0.39 | 0.29 |
| Intra-layer adhesion | — | not exfoliated | — | — |
| Uneven thickness | % | 30 | 30 | 80 |
| Oxygen permeability | ml/m$^2$ . day . atom | 12.5 | 35 | 9.3 |
| Fragrance keeping | — | not significant | not significant | significant |
| Transmission of parallel light | % | 83 | 82 | 84 |
| Tensile secant modulus of elasticity | kg/mm$^2$ | 75 | 100 | 4 |
| Buckling deformation | — | no | no | yes |
| Formability | — | A | A | C |

COMPARATIVE EXAMPLE 4

A parison produced by intra-die lamination at a resin temperature of 285° C. and an extruding rate of 210 g/min using as an outer layer a thermoplastic block-copolymerized polyester (Pelprene® Type P-150B, manufactured by Toyo Spinning Co., Ltd., Japan, specific gravity of 1.228 and melting point of 212° C. with brittle point of lower than −70° C., of oxygen-permeating rate of $1 \times 10^{-10}$ cc-cm/cm$^2$·sec·cmHg) and using as an inner layer the same polycarbonate as in Comparative Example 2 with the ratio of thickness of both layers of 1:1 was shape-formed in the same manner as in Examples 1 to 5, and the physical properties of the thus shaped article were measured. The results are shown in Table 3.

For comparison, the properties of the shaped articles prepared by Examples 5 and 6, and by Comparative Example 2 are also shown in Table 3.

TABLE 3

| Items determined | Unit | Comparative Example 4 | Comparative Example 2 | Example 6 | Example 5 |
|---|---|---|---|---|---|
| Percentage of polycarbonate in total thickness | % | 50 | 0 | 50 | 50 |
| Weight | g | 13.0 | 13.0 | 12.8 | 13.0 |
| Mean thickness | mm | 0.33 | 0.39 | 0.33 | 0.38 |
| Inter-layer adhesion | — | not exfoliated | — | not exfoliated | not exfoliated |
| Oxygen permeability | ml/m$^2$ . day . atom | 35 | 35 | 12.5 | 12 |
| Fragrance keeping | — | not significant | not significant | not significant | not significant |
| Transmission of parallel light | % | 82.5 | 82.0 | 83.0 | 82.3 |
| Tensile secant modulus of elasticity | kg/mm$^2$ | 44 | 100 | 75 | 81 |
| Buckling deformation | — | no | no | no | no |
| Formability | — | A | A | A | A |

What is claimed is:

1. A multi-layered hollow container having a wall comprising at least one layer of a thermoplastic polyester and at least one layer of a polycarbonate, said layer of thermoplastic polyester and said layer of polycarbonate being intra-dielaminated, co-extruded and then direct-blown prior to solidifying to form the multi-layered hollow container having a permeability coefficient to gaseous oxygen of less than 15 ml/m$^2$·day·atom, and a tensile secant modulus of elasticity of more than 10 kg/mm$^2$ at 1% strain and at a temperature of 80° C., the thickness of said layer of a polycarbonate being more than 10 micrometers and 5 to 60% of the total thickness of the wall of said multi-layered hollow container.

2. The multi-layered hollow container of claim 1, wherein said thermoplastic polyester has an intrinsic viscosity of 0.6 to 1.2 g/dl and an oxygen-permeating rate of $1 \times 10^{-10}$ cc-cm/cm$^2$·sec·cmHg.

3. The multi-layered hollow container of claim 1, wherein said container comprises one thermoplastic polyester layer and one layer of polycarbonate layer.

4. The multi-layered hollow container of claim 1, wherein the innermost layer comprises a polycarbonate represented by the formula:

$$\left( C(=O) - O - \phi - C(R)(R') - \phi - O \right)_{\overline{n}}$$

wherein R and R' are respectively selected from hydrogen, alkyl groups of carbon number of 1–6 and phenyl group, obtainable by the phosgene method and having a number-average molecular weight in the range of between 10,000 and 50,000.

* * * * *